United States Patent
Kim et al.

(10) Patent No.: US 7,883,230 B2
(45) Date of Patent: Feb. 8, 2011

(54) SUPPORTING MEMBER FOR LIQUID CRYSTAL DISPLAY DEVICE, BACKLIGHT ASSEMBLY HAVING THE SAME AND LIQUID CRYSTAL DISPLAY DEVICE HAVING THE SAME

(75) Inventors: Yong-Il Kim, Yongin-si (KR); Min-Ho Ok, Hwaseong-si (KR); Sang-Hoon Park, Yongin-si (KR)

(73) Assignee: Samsung Electronics Co., Ltd., Suwon-So, Gyeonggi-Do (KR)

( * ) Notice: Subject to any disclaimer, the term of this patent is extended or adjusted under 35 U.S.C. 154(b) by 416 days.

(21) Appl. No.: 11/371,187

(22) Filed: Mar. 8, 2006

(65) Prior Publication Data
US 2007/0210694 A1 Sep. 13, 2007

(51) Int. Cl.
*G09F 13/08* (2006.01)
(52) U.S. Cl. ............. 362/97.1; 362/97.4; 362/217.01; 362/307; 362/306
(58) Field of Classification Search ............ 362/225, 362/223, 632–634, 613, 217, 221, 97.1, 97.2, 362/97.4, 306–307, 296.01; 349/70, 61–64, 349/66–67
See application file for complete search history.

(56) References Cited

U.S. PATENT DOCUMENTS

| | | | |
|---|---|---|---|
| 7,070,313 B2* | 7/2006 | Kim et al. | 362/561 |
| 7,163,319 B2* | 1/2007 | Kuo et al. | 362/306 |
| 7,192,149 B2* | 3/2007 | Lai | 362/29 |
| 7,270,467 B2* | 9/2007 | Kim | 362/634 |
| 2004/0257792 A1* | 12/2004 | Yu et al. | 362/31 |
| 2006/0018130 A1* | 1/2006 | Lee | 362/632 |
| 2006/0039163 A1* | 2/2006 | Yun | 362/600 |
| 2006/0158905 A1* | 7/2006 | Lai et al. | 362/634 |
| 2007/0019419 A1* | 1/2007 | Hafuka et al. | 362/373 |

FOREIGN PATENT DOCUMENTS

JP 2001-210126 8/2001
KR 1020000061434 10/2000

OTHER PUBLICATIONS

English Abstract for Publication No. 1020000061434.

* cited by examiner

*Primary Examiner*—Robert J May
(74) *Attorney, Agent, or Firm*—F. Chau & Associates, LLC (57) ABSTRACT

A supporting member for a liquid crystal display device comprises a base substrate, a lamp clip protruded from the base substrate in a first direction to hold a lamp that generates light, a supporting part protruded from the base substrate in the first direction to support a diffusion member that diffuses the light generated from the lamp, and a fixing clip protruded from the base substrate in a second direction substantially opposite to the first direction, wherein the fixing clip combines with a receiving container.

26 Claims, 3 Drawing Sheets

SUPPORTING MEMBER FOR LIQUID CRYSTAL DISPLAY DEVICE, BACKLIGHT ASSEMBLY HAVING THE SAME AND LIQUID CRYSTAL DISPLAY DEVICE HAVING THE SAME

BACKGROUND OF THE INVENTION

1. Technical Field

The present disclosure relates to a supporting member for a liquid crystal display (LCD) device, and, more particularly, to a supporting member for an LCD device capable of improving an image display quality, a backlight assembly having the supporting member and an LCD device having the supporting member.

2. Discussion of the Related Art

A liquid crystal display (LCD) device displays an image using electrical and optical characteristics of liquid crystals. The LCD device includes an LCD panel and a backlight assembly. The LCD panel displays an image based on an image signal and light. The backlight assembly supplies the LCD panel with the light.

The backlight assembly can be classified as an edge illumination type backlight assembly and a direct illumination type backlight assembly based on a location of a light source.

The edge illumination type backlight assembly includes at least one light source on a side of a light guiding plate. The direct illumination type backlight assembly includes a plurality of light sources corresponding to an effective display region in which the image is displayed. The light generated from the light sources is irradiated onto the LCD panel.

The direct illumination type backlight assembly includes light sources, a diffusion plate, a supporting member, a reflecting plate and a receiving container. The diffusion plate is positioned between the light sources and the LCD panel. The supporting member supports the light sources and the diffusion plate so that the light sources can be spaced apart from the diffusion plate by a predetermined distance. A portion of the light leaked from the light sources can be reflected from the reflecting plate. The receiving container receives the light source.

The supporting member is interposed between the reflecting plate and the diffusion plate. The supporting member is positioned on the reflecting plate. The supporting member includes a lamp clip and a supporting part. A light source such as, for example, a lamp is positioned in the lamp clip. The supporting member supports the diffusion plate. The lamp clip receives the lamp, and the supporting member is fixed to the receiving container. When the supporting member does not securely hold the lamp, the lamp drifts in the receiving container so that a distance between the diffusion plate and the lamp can be inconsistent, thereby deteriorating an image display quality.

SUMMARY OF THE INVENTION

Embodiments of the present invention provide a supporting member for an LCD device capable of improving an image display quality, a backlight assembly having the supporting member, and an LCD device having the supporting member.

According to an embodiment of the present invention, a supporting member for a liquid crystal display device comprises a base substrate, a lamp clip protruded from the base substrate in a first direction to hold a lamp that generates light, a supporting part protruded from the base substrate in the first direction to support a diffusion member that diffuses the light generated from the lamp, and a fixing clip protruded from the base substrate in a second direction substantially opposite to the first direction, wherein the fixing clip combines with a receiving container.

According to an embodiment of the present invention, a backlight assembly comprises a lamp that generates light, a diffusion member to diffuse the light generated from the lamp, a supporting member to support the diffusion member to maintain a distance between the lamp and the diffusion member, a receiving container to receive the lamp and the supporting member, the receiving container including a combining hole to receive a portion of the supporting member, and a light leakage blocking member interposed between the supporting member and the receiving container to block light leakage through the combining hole.

The light leakage blocking member may be adjacent to and surrounds at least part of the combining hole. The supporting member may comprise a base substrate, a lamp clip protruded from the base substrate in a first direction to hold the lamp, a supporting part protruded from the base substrate in the first direction to support the diffusion member, and a fixing clip protruded from the base substrate in a second direction to be inserted into the combining hole so that the supporting member is combined with the receiving container.

The backlight assembly may further comprise a reflecting plate interposed between the supporting member and the receiving container. The reflecting plate may include a fixing hole corresponding to the combining hole to receive the portion of the supporting member. The light leakage blocking member may be interposed between the reflecting plate and the supporting member, and adjacent to the fixing hole to surround at least part of the fixing hole. The light leakage blocking member may comprise a synthetic resin.

According to an embodiment of the present invention, a backlight assembly comprises a lamp generating light, a diffusion plate to diffuse the light generated from the lamp, a receiving container to receive the lamp, the receiving container including a combining hole, and a supporting member to support the diffusion plate to maintain a distance between the lamp and the diffusion plate, the supporting member including a light leakage blocking protrusion to block light leakage through the combining hole.

According to an embodiment of the present invention, a backlight assembly comprises a lamp generating light, a diffusion member to diffuse the light generated from the lamp, a supporting member to support the diffusion member to maintain a distance between the diffusion member and the lamp, and a receiving container to receive the lamp and the supporting member, the receiving container including a light leakage blocking protrusion protruded toward the lamp and a combining hole corresponding to the light leakage blocking protrusion to receive a portion of the supporting member.

According to an embodiment of the present invention, a liquid crystal display device comprises a liquid crystal display panel that displays an image, and a backlight assembly including a lamp generating light, a diffusion member to diffuse the light generated from the lamp, a supporting member to support the diffusion member to maintain a distance between the lamp and the diffusion plate, a receiving container to receive the lamp, the receiving container including a combining hole to receive a portion of the supporting member, and a light leakage blocking member interposed between the supporting member and the receiving container to block light leakage through the combining hole.

According to an embodiment of the present invention, a liquid crystal display device comprises a liquid crystal display panel that displays an image, and a backlight assembly including a lamp generating light, a diffusion member to diffuse the light generated from the lamp, a receiving container to receive the lamp, the receiving container including a combining hole, and a supporting member to support the diffusion member to maintain a distance between the lamp and the diffusion plate, the supporting member including a light leakage blocking protrusion that blocks a light leakage through the combining hole.

According to an embodiment of the present invention, a liquid crystal display device comprises a liquid crystal display panel that displays an image, and a backlight assembly including a lamp generating light, a diffusion member to diffuse the light generated from the lamp, a supporting member to support the diffusion member to maintain a distance between the lamp and the diffusion plate, and a receiving container to receive the lamp and the supporting member, the receiving container including a light leakage blocking protrusion protruded toward the lamp and a combining hole corresponding to the light leakage blocking protrusion to receive a portion of the supporting member.

BRIEF DESCRIPTION OF THE DRAWINGS

Exemplary embodiments of the present invention can be understood in more detail from the following description taken in conjunction with the accompanying drawings in which.

DESCRIPTION OF THE EXEMPLARY EMBODIMENTS

Exemplary embodiments of the present invention are more fully described below with reference to the accompanying drawings. The present invention may be embodied in many different forms and should not be construed as being limited to the embodiments set forth herein.

Figure 1:
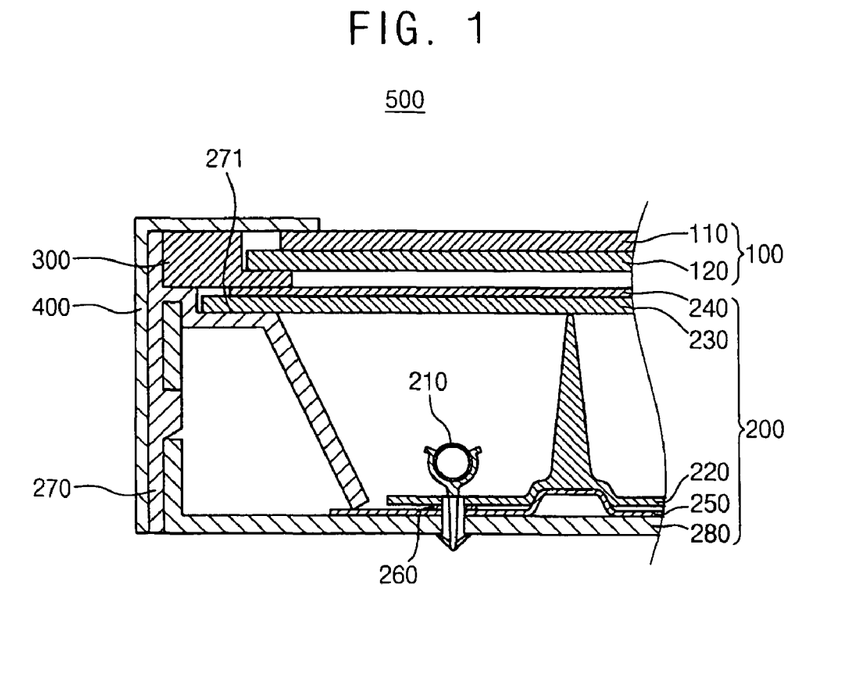
FIG. 1 is a cross-sectional view showing a liquid crystal display (LCD) device in accordance with an embodiment of the present invention.

FIG. 1 is a cross-sectional view showing a liquid crystal display (LCD) device in accordance with an embodiment of the present invention.

Referring to FIG. 1, the LCD device 500 includes an LCD panel 100, a backlight assembly 200, a first mold frame 300 and a top chassis 400. The LCD panel 100 displays an image using light from a light source. The backlight assembly 200 supplies the LCD panel 100 with the light. The first mold frame 300 and the top chassis 400 receive the LCD panel 100.

The LCD panel 100 includes a thin film transistor (TFT) substrate 110, a color filter substrate 120 and a liquid crystal layer (not shown). The color filter substrate 120 corresponds to the TFT substrate 110. The liquid crystal layer (not shown) is interposed between the TFT substrate 110 and the color filter substrate 120.

The TFT substrate 110 includes a plurality of thin film transistors (not shown) arranged in a matrix shape. The TFT substrate 110 may be a transparent substrate. The color filter substrate 120 corresponding to the TFT substrate 110 includes red, green and blue color filters that display red, green and blue color, respectively. The color filter substrate 120 may be a transparent substrate.

The backlight assembly 200 is formed under/behind the LCD panel 100 to supply the LCD panel 100 with the light.

The backlight assembly 200 includes a plurality of lamps 210 generating light, a supporting member 220, a diffusion plate 230, a diffusion sheet 240, a reflecting plate 250, a light leakage blocking member 260, a second mold frame 270 and a receiving container 280. The diffusion plate 230 and the diffusion sheet 240 diffuse the light. The light leakage blocking member 260 is interposed between the supporting member 220 and the reflecting plate 250. The second mold frame 270 and the receiving container 280 receive the lamps 210.

The lamps 210 generate the light using, for example, an externally provided electric power. The lamps 210 correspond to the effective display region in which the image is displayed. The light is irradiated onto the LCD panel 100.

The supporting member 220 is interposed between the diffusion plate 230 and the reflecting plate 250 so that the diffusion plate 230 is spaced apart from the lamps 210 by a constant distance. The supporting member 220 holds the lamps 210, and is fixed to the receiving container 280 so that the lamps 210 are fixed to the receiving container 280.

The diffusion plate 230 and the diffusion sheet 240 are interposed between the lamps 210 and the LCD panel 100. The diffusion sheet 240 is formed on the diffusion plate 230. The diffusion plate 230 and the diffusion sheet 240 increase a luminance uniformity and a luminance when viewed on a plane of the backlight assembly 200.

The reflecting plate 250 is formed under/behind the lamps 210. A portion of the light generated from the lamps 210 is reflected from the reflecting plate 250 toward the diffusion plate 230. The reflecting plate 250 includes a plurality of first fixing holes 251 and a plurality of second fixing holes 252 to receive lamp clips 222a, 222b.

The light leakage blocking member 260 is interposed between the supporting member 220 and the reflecting plate 250 to block a light leakage through the first and second fixing holes 251 and 252.

The second mold frame 270 receives the lamps 210, the diffusion plate 230 and the diffusion sheet 240. The second mold frame 270 includes a bottom plate having an opening and a sidewall protruded from sides of the bottom plate to surround the bottom plate. The lamps 210 are received on the bottom plate of the second mold frame 270. The sidewall of the second mold frame 270 includes a stepped portion 271 to receive the diffusion plate 230 and the diffusion sheet 240.

The diffusion plate 230 is spaced apart from the lamps 210 by a constant distance. The stepped portion 271 supports a peripheral portion of the diffusion plate 230. The supporting member 220 supports a central portion of the diffusion plate 230 to prevent the diffusion plate 230 from sagging, and to maintain the constant distance between the diffusion plate 230 and the lamps 210.

The second mold frame 270 is received by the receiving container 280. The receiving container 280 receives the lamps 210, and is combined with the reflecting plate 250 to hold the supporting member 220.

The first mold frame 300 is formed on the backlight assembly 200. The first mold frame 300 has an opening through which the light generated from the backlight assembly 200 passes. The first mold frame 300 receives the LCD panel 100, and is combined with the second mold frame 270 so that the diffusion plate 230 and the diffusion sheet 240 are fixed to the second mold frame 270.

The top chassis 400 is formed on the LCD panel 100. The top chassis 400 is combined with the receiving container 280 so that the LCD panel 100 is coupled to the first mold frame 300. The top chassis 400 covers a part of the LCD panel 100, and exposes an effective display region of the LCD panel 100.

Figure 2:
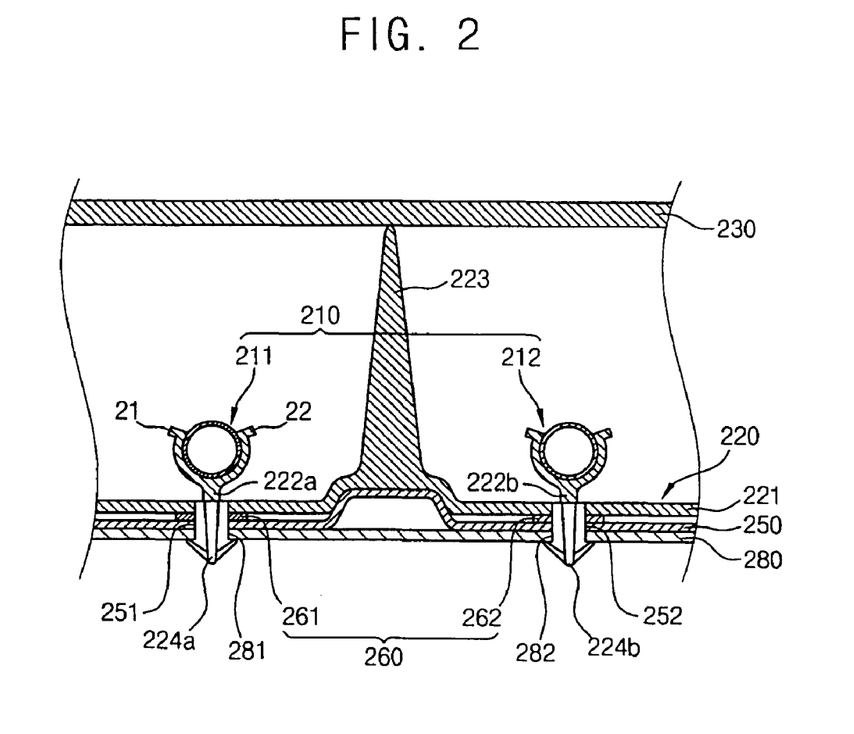
FIG. 2 is a cross-sectional view showing a backlight assembly shown in FIG. 1 according to an embodiment of the present invention.
Figure 3:
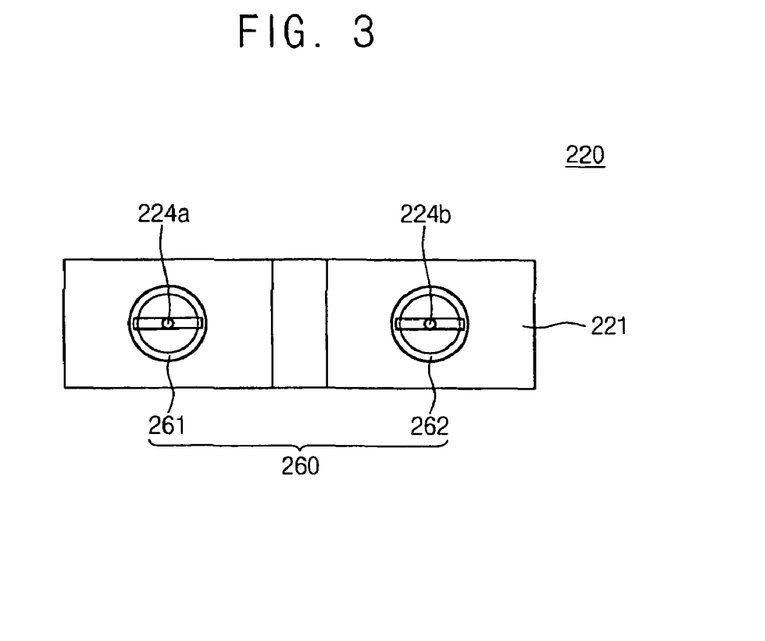
FIG. 3 is a plan view showing a rear side of a supporting member shown in FIG. 2 according to an embodiment of the present invention.

FIG. 2 is a cross-sectional view showing a backlight assembly shown in FIG. 1 according to an embodiment of the present invention. FIG. 3 is a plan view showing a rear side of a supporting member shown in FIG. 2 according to an embodiment of the present invention.

Referring to FIGS. 2 and 3, the supporting member 220 includes a base substrate 221, a plurality of lamp clips 222a and 222b, a supporting part 223 and a plurality of fixing clips 224a and 224b. The base substrate 221 contacts the reflecting plate 250. The lamp clips 222a and 222b hold the lamps 210. The supporting part 223 supports the diffusion plate 230. The fixing clips 224a and 224b are combined with the receiving container 280.

The lamp clips include a first lamp clip 222a and a second lamp clip 222b. The first and second lamp clips 222a and 222b are protruded from the base substrate 221 toward the diffusion plate 230 in a first direction. Referring to FIGS. 2 and 3, the supporting member 220 includes two lamp clips 222a and 222b according to an embodiment of the present invention. Alternatively, the number of the lamp clips may be changed based on the number of the lamps 210.

The first lamp clip 222a is combined with a first lamp 211 to hold the first lamp 211. The first lamp clip 222a includes a first wing 21 and a second wing 22. The first and second wings 21 and 22 surround a portion of the first lamp 211. The second wing 22 corresponds to the first wing 21.

The second lamp clip 222b has a substantially same structure as the first lamp clip 222a. The second lamp clip 222b is combined with a second lamp 212 to hold the second lamp 212. The supporting part 223 is formed between the first and second lamp clips 222a and 222b. The supporting part 223 is protruded from the base substrate 221 toward the diffusion plate 230 in the first direction to support the diffusion plate 230.

The fixing clips 224a and 224b are protruded from the base substrate 221 toward the reflecting plate 250 in a second direction that is substantially opposite to the first direction to be combined with the reflecting plate 250 and the receiving container 280. The fixing clips include a first fixing clip 224a and a second fixing clip 224b. Referring to FIGS. 2 and 3, the supporting member 220 includes two fixing clips 224a and 224b according to an embodiment of the present invention. Alternatively, the number of the fixing clips may be changed based on, for example, a length of the base substrate 221 or the number of the lamp clips 222a and 222b.

The first fixing clip 224a corresponds to the first lamp clip 222a. The second fixing clip 224b corresponds to the second lamp clip 222b. Each of the first and second fixing clips 224a and 224b has an arrow shape to be combined with the receiving container 280.

The reflecting plate 250 includes a plurality of fixing holes into which the first and second fixing clips 224a and 224b are inserted. The fixing holes include a first fixing hole 251 and a second fixing hole 252.

The first fixing hole 251 corresponds to the first fixing clip 224a, and the second fixing hole 252 corresponds to the second fixing clip 224b. Referring to FIGS. 2 and 3, the reflecting plate 250 includes two fixing holes 251 and 252 according to an embodiment of the present invention. Alternatively, the number of the fixing holes may be changed based on, for example, the number of the supporting members 220 and/or the number of the lamp clips 222a and 222b.

The light leakage blocking member 260 between the reflecting plate 250 and the supporting member 220 includes a first light leakage blocking member 261 and a second light leakage blocking member 262. Each of the first and second light leakage blocking members 261 and 262 blocks light leakage through each of the first and second fixing holes 251 and 252. Referring to FIGS. 2 and 3, the backlight assembly 200 includes two light leakage blocking members 261 and 262 according to an embodiment of the present invention. Alternatively, the number of the light leakage blocking members may be changed based on, for example, the number of the fixing holes 251 and 252.

Referring again to FIG. 3, the first light leakage blocking member 261 surrounds the first fixing hole 251. The second light leakage blocking member 262 surrounds the second fixing hole 252. According to an embodiment of the present invention, each of the first and second light leakage blocking members 261 and 262 includes, for example, a synthetic resin.

A plurality of combining holes that correspond to the fixing holes 251, 252 are formed on the receiving container 280. The combining holes include a first combining hole 281 and a second combining hole 282. The first combining hole 281 corresponds to the first fixing hole 251. The second combining hole 282 corresponds to the second fixing hole 252. Referring to FIGS. 2 and 3, the receiving container 280 includes two combining holes 281 and 282 according to an embodiment of the present invention. Alternatively, the number of the combining holes may be changed based on, for example, the number of the fixing holes 251, 252.

The first fixing clip 224a passes through the first fixing hole 251 and the first combining hole 281 to be combined with the receiving container 280. The second fixing clip 224b passes through the second fixing hole 252 and the second combining hole 282 to be combined with the receiving container 280.

In the backlight assembly according to an embodiment of the present invention as shown in FIGS. 1 and 3, the light leakage blocking member 260 blocks the light leakage through the fixing holes and the combining holes to improve a luminance of the backlight assembly and an image display quality of the LCD device.

Figure 4:
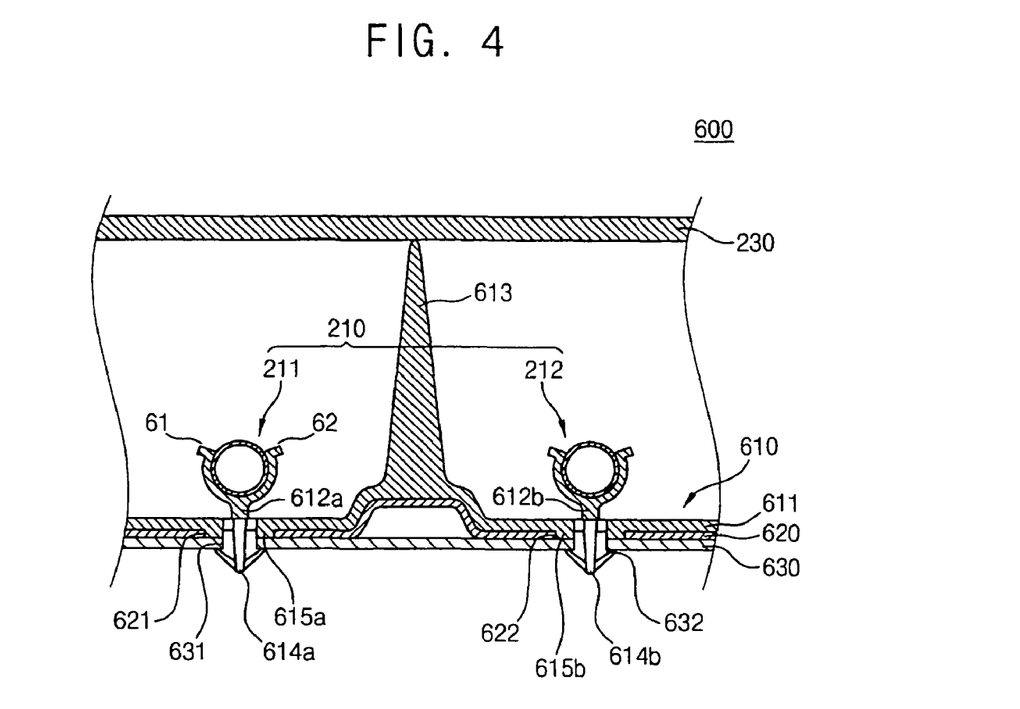
FIG. 4 is a cross-sectional view showing a backlight assembly in accordance with an embodiment of the present invention.

FIG. 4 is a cross-sectional view showing a backlight assembly in accordance with another embodiment of the present invention. The backlight assembly 600 of FIG. 4 is substantially the same as the backlight assembly 200 in FIGS. 1 to 3 except for the supporting member, reflecting plate and receiving container.

In FIG. 4, to describe a relationship between a supporting member 610 and a receiving container 630 with more clarity, a diffusion sheet and a second mold frame are omitted. Alternatively, the backlight assembly shown in FIG. 4 may further include the diffusion sheet and the second mold frame.

Referring to FIG. 4, the backlight assembly 600 includes a plurality of lamps 210 generating light, a supporting member 610, a diffusion plate 230, a reflecting plate 620 formed between the supporting member 610 and a receiving container 630.

The supporting member 610 is interposed between the diffusion plate 230 and the reflecting plate 620 so that the diffusion plate 230 is spaced apart from the lamps 210 by a constant distance.

The supporting member 610 includes a base substrate 611, a plurality of lamp clips 612a and 612b, a supporting part 613, a plurality of fixing clips 614a and 614b and a plurality of light leakage blocking protrusions 615a and 615b. The base substrate 611 contacts the reflecting plate 620. The lamp clips 612a and 612b hold the lamps 210. The supporting part 613 supports the diffusion plate 230. The fixing clips 614a and 614b are combined with the receiving container 630. The light leakage blocking protrusions 615a and 615b block light leakage of the backlight assembly 600.

The lamp clips includes a first lamp clip 612a and a second lamp clip 612b. The first and second lamp clips 612a and 612b are protruded from the base substrate 611 toward the diffusion plate 230 in a first direction. Referring to FIG. 4, the supporting member 610 includes two lamp clips 612a and 612b. Alternatively, the number of the lamp clips may be changed based on, for example, the number of the lamps 210.

The first lamp clip 612a is combined with a first lamp 211 to hold the first lamp 211. The first lamp clip 612a includes a first wing 61 and a second wing 62. The first and second wings 61 and 62 surround a portion of the first lamp 211. The second wing 62 corresponds to the first wing 61.

The second lamp clip 612b has a substantially same structure as the first lamp clip 612a.

The second clip 612b is combined with a second lamp 212 of the lamps 210 to hold the second lamp 212.

The supporting part 613 is positioned between the first and second lamp clips 612a and 612b. The supporting part 613 is protruded from the base substrate 611 toward the diffusion plate 230 in the first direction to support the diffusion plate 230.

The fixing clips 614a and 614b are protruded from the base substrate 611 toward the reflecting plate 620 in a second direction that is substantially opposite to the first direction to be combined with the reflecting plate 620 and the receiving container 630. The fixing clips include a first fixing clip 614a and a second fixing clip 614b. Referring to FIG. 4, the supporting member 610 includes two fixing clips 614a and 614b. Alternatively, the number of the fixing clips may be changed based on, for example, a length of the base substrate 611 and/or the number of the lamp clips 612a and 612b.

The first fixing clip 614a corresponds to the first lamp clip 612a. The second fixing clip 614b corresponds to the second lamp clip 612b. Each of the first and second fixing clips 614a and 614b has an arrow shape to be combined with the receiving container 630.

Each of the light leakage blocking protrusions 615a and 615b surrounds each of the lamp clips 612a and 612b. The light leakage blocking protrusions 615a and 615b are protruded from the base substrate 611 toward the reflecting plate 620 in the second direction. The light leakage blocking protrusions include a first light leakage blocking protrusion 615a and a second light leakage blocking protrusion 615b. Referring to FIG. 4, the supporting member 610 includes two light leakage blocking protrusions 615a and 615b. Alternatively, the number of the light leakage blocking protrusions 615a and 615b may be changed based on, for example, the number of the fixing clips.

The first light leakage blocking protrusion 615a is spaced apart from the first lamp clip 612a, and surrounds the first fixing clip 614a.

The second light leakage blocking protrusion 615b is spaced apart from the second lamp clip 612b, and surrounds the second fixing clip 614b.

The reflecting plate 620 is formed under/behind the base substrate 611. A portion of the light generated from the lamps 210 is reflected from the reflecting plate 620 toward the diffusion plate 230 to increase a luminance of the backlight assembly 600.

The reflecting plate 620 includes a plurality of fixing holes 621 and 622 to be combined with the supporting member 610. The fixing holes 621 and 622 correspond to the lamp clips 612a and 612b, respectively. The first light leakage blocking protrusion 615a is inserted into the first fixing hole 621 to fix the supporting member 610 to the reflecting plate 620. The second light leakage blocking protrusion 615b is inserted into the second fixing hole 622 to fix the supporting member 610 to the reflecting plate 620.

That is, the first and second light leakage blocking protrusions 615a and 615b are received in the first and second fixing holes 621 and 622 to block the light leakage through the first and second fixing holes 621 and 622, respectively. Each of the first and second light leakage blocking protrusions 615a and 615b has a substantially same thickness as the reflecting plate 620.

The receiving container 630 is formed under/behind the reflecting plate 620. The receiving container 630 receives the reflecting plate 620 and the lamps 210. A plurality of combining holes 631 and 632 that correspond to the fixing holes are formed in the receiving container 630.

The combining holes include a first combining hole 631 and a second combining hole 632. The first combining hole 631 corresponds to the first fixing hole 621, and is combined with the first fixing clip 614a. The second combining hole 632 corresponds to the second fixing hole 622, and is combined with the second fixing clip 614b. The first and second light leakage blocking protrusions 615a and 615b contact peripheral regions of the first and second combining holes 631 and 632, respectively.

A burr is formed on each of the first and second fixing holes 621 and 622 and the first and second combining holes 631 and 632 so that each of the first and second light leakage blocking protrusions 615a and 615b, and each of the first and second fixing clips 614a and 614b are easily inserted into each of the first and second fixing holes 621 and 622 and the first and second combining holes 631 and 632. As a result, light is not leaked from the backlight assembly 600.

The first fixing clip 614a passes through the first fixing hole 621 and the first combining hole 631 to be combined with the receiving container 630. The second fixing clip 614b passes through the second fixing hole 622 and the second combining hole 632 to be combined with the receiving container 630.

According to the backlight assembly shown in FIG. 4, the supporting member 610 includes the first and second light leakage blocking protrusions 615a and 615b that block the light leakage through the first and second fixing holes 621 and 622 and the first and second combining holes 631 and 632 to improve a luminance of the backlight assembly 600 and an image display quality of the LCD device.

Figure 5:
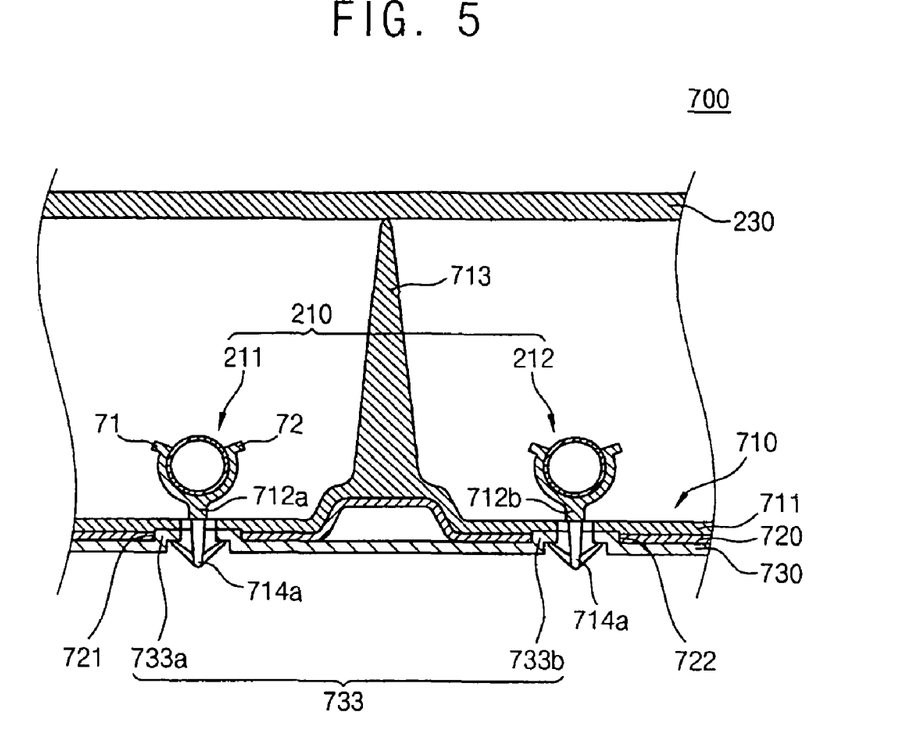
FIG. 5 is a cross-sectional view showing a backlight assembly in accordance with an embodiment of the present invention.
Figure 6:
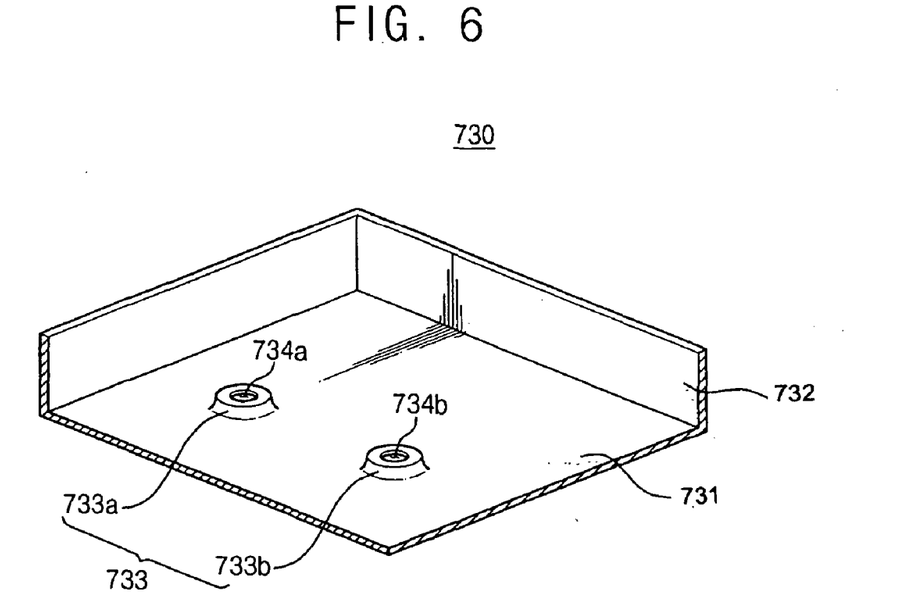
FIG. 6 is a perspective view showing a receiving container shown in FIG. 5 according to an embodiment of the present invention.

FIG. 5 is a cross-sectional view showing a backlight assembly 700 in accordance with another embodiment of the present invention. FIG. 6 is a perspective view showing a receiving container 730 shown in FIG. 5.

The backlight assembly of FIGS. 5 and 6 is substantially the same as in FIGS. 1 to 3 except for the supporting member, reflecting plate and receiving container.

In FIGS. 5 and 6, to describe a relationship between a supporting member 710 and a receiving container 730 with more clarity, a diffusion sheet and a second mold frame are omitted. Alternatively, the backlight assembly of FIG. 5 may further include the diffusion sheet and the second mold frame.

Referring to FIGS. 5 and 6, the backlight assembly 700 includes a plurality of lamps 210 generating light, a diffusion plate 230 that diffuses the light, a supporting member 710 interposed between the diffusion plate 230 and the lamps 210 to maintain a distance between the diffusion plate 230 and the lamps 210, a reflecting plate 720 between the supporting member 710 and the receiving container 730.

The supporting member 710 includes a base substrate 711, a plurality of lamp clips 712a and 712b, a supporting part 713 and a plurality of fixing clips 714a and 714b. The base substrate 711 contacts the reflecting plate 720. The lamp clips 712a and 712b hold the lamps 210. The supporting part 713 supports the diffusion plate 230. The fixing clips 714a and 714b are combined with the receiving container 730.

The lamp clips include a first lamp clip 712a and a second lamp clip 712b. The first and second lamp clips 712a and 712b are protruded from the base substrate 711 toward the diffusion plate 230 in a first direction. In FIG. 5, the supporting member 710 includes two lamp clips 712a and 712b. Alternatively, the number of the lamp clips may be changed based on, for example, the number of the lamps 210.

The first lamp clip 712a is combined with a first lamp 211 to hold the first lamp 211. The first lamp clip 712a includes a first wing 71 and a second wing 72. The first and second wings 71 and 72 surround a portion of the first lamp 211. The second wing 72 corresponds to the first wing 71.

The second lamp clip 712b has a substantially same structure as the first lamp clip 712a. The second lamp clip 712b is combined with a second lamp 212 to hold the second lamp 712.

The supporting part 713 is positioned between the first and second lamp clips 712a and 712b. The supporting part 713 is protruded from the base substrate 711 toward the diffusion plate 230 in the first direction to support the diffusion plate 230.

The fixing clips, 714a and 714b are protruded from the base substrate 711 toward the reflecting plate 720 in a second direction that is substantially opposite to the first direction to be combined with the reflecting plate 720 and the receiving container 730. The fixing clips include a first fixing clip 714a and a second fixing clip 714b. Referring to FIG. 5, the supporting member 710 includes two fixing clips 714a and 714b. Alternatively, the number of the fixing clips may be changed based on, for example, a length of the base substrate 711 and/or the number of the lamp clips 712a and 712b.

The first fixing clip 714a corresponds to the first lamp clip 712a. The second fixing clip 714b corresponds to the second lamp clip 712b. Each of the first and second fixing clips 714a and 714b has an arrow shape to be combined with the receiving container 730.

The reflecting plate 720 is positioned under/behind the supporting member 710. A portion of the light generated from the lamps 210 is reflected from the reflecting plate 720 toward the diffusion plate 230 to increase a luminance of the backlight assembly 700.

The reflecting plate 720 includes a plurality of fixing holes 721 and 722 to receive the fixing clips 714a and 714b. The fixing holes 721 and 722 correspond to the fixing clips 714a and 714b, respectively. The first fixing clip 714a is inserted into the first fixing hole 721 to fix the supporting member 710 to the reflecting plate 720. The second fixing clip 714b is inserted into the second fixing hole 722 to fix the supporting member 710 to the reflecting plate 720.

The receiving container 730 is positioned under the reflecting plate 720. The receiving container 730 receives the reflecting plate 720 and the lamps 210.

Referring to FIGS. 5 and 6, the receiving container 730 includes a bottom plate 731 and a sidewall 732. The reflecting plate 720 is received on the bottom plate 731. The sidewall 732 is protruded from sides of the bottom plate 731 to form a receiving space.

A plurality of light leakage blocking protrusions 733 is formed on the bottom plate 731. The light leakage blocking protrusions 733 correspond to the fixing holes 721 and 722, respectively. The light leakage blocking protrusions 733 are protruded from the bottom plate 731 in the first direction.

The light leakage blocking protrusions 733 include a first light leakage blocking protrusion 733a and a second light leakage blocking protrusion 733b. The first light leakage blocking protrusion 733a is inserted into the first fixing hole 721. The second light leakage blocking protrusion 733b is inserted into the second fixing hole 722.

Each of the first and second light leakage blocking protrusions 733a and 733b has a substantially circular shape that is substantially same as each of the first and second fixing holes 721 and 722.

A plurality of combining holes 734a and 734b is formed on the light leakage blocking protrusions 733, respectively. The combining holes include a first combining hole 734a and a second combining hole 734b. The first combining hole 734a is formed on the first light leakage blocking protrusion 733a. The second combining hole 734b is formed on the second light leakage blocking protrusion 733b.

Each of the first and second combining holes 734a and 734b is on a central portion of each of the first and second light leakage blocking members 733a and 733b. Peripheral regions of the first and second combining holes 734a and 734b contact the base substrate 711 of the supporting member 710.

The first fixing clip 714a is inserted into the first combining hole 734a to be combined with the receiving container 730. The second fixing clip 714b is inserted into the second combining hole 734b to be combined with the receiving container 730.

According to the backlight assembly 700 shown in FIGS. 5 and 6, the receiving container 730 includes the light leakage blocking protrusions 733 that block the light leakage through the first and second fixing holes 721 and 722 to improve a luminance of the backlight assembly and an image display quality of the LCD device.

According to an embodiment of the present invention, the backlight assembly includes the supporting member that maintains the constant distance between the lamps and the diffusion plate. The reflecting plate and the receiving container include the fixing holes and the combining holes, respectively. The light leakage blocking member is interposed between the supporting member and the reflecting plate to block the light leakage through the fixing holes and the combining holes. Therefore, the luminance of the backlight assembly and the image display quality of the LCD device are improved.

According to an embodiment of the present invention, the backlight assembly includes the supporting member that maintains the constant distance between the diffusion plate and the lamps. The reflecting plate and the receiving container include the fixing holes and the combining holes, respectively. The supporting member includes the light leakage blocking protrusion to block the light leakage through the fixing holes. Therefore, the luminance of the backlight assembly and the image display quality of the LCD device are improved.

According to an embodiment of the present invention, the backlight assembly includes the supporting member that maintains the constant distance between the diffusion plate and the lamps, the reflecting plate and the receiving container. The reflecting plate includes the fixing holes to be combined with the supporting member. The receiving container includes the light leakage blocking protrusion to block the light leakage through the fixing holes. The light leakage blocking protrusion includes the combining holes to be combined with the supporting member. Therefore, the luminance of the backlight assembly and the image display quality of the LCD device are improved.

Although exemplary embodiments have been described with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. A backlight assembly comprising:
a lamp that generates light;
a diffusion member to diffuse the light generated from the lamp;
a supporting member to support the diffusion member to maintain a distance between the lamp and the diffusion member;
a receiving container to receive the lamp and the supporting member, the receiving container including a combining hole to receive a portion of the supporting member;
a light leakage blocking member disposed under the lamp between the supporting member and the receiving container to block light leakage through the combining hole; and
a reflecting plate interposed between the supporting member and the receiving container,
wherein the light leakage blocking member is interposed between the reflecting plate and the supporting member, the light leakage blocking member overlapping the reflecting plate without covering the combining hole,
wherein the supporting member comprises:
a base substrate;
a lamp clip protruded from the base substrate in a first direction to hold the lamp;
a supporting part protruded from the base substrate in the first direction to support the diffusion member; and
a fixing clip protruded from the base substrate in a second direction to be inserted into the combining hole so that the supporting member is combined with the receiving container.

2. The backlight assembly of claim 1, wherein the light leakage blocking member is adjacent to the combining hole, and surrounds at least part of the combining hole.

3. The backlight assembly of claim 1, wherein the reflecting plate includes a fixing hole corresponding to the combining hole to receive the portion of the supporting member.

4. The backlight assembly of claim 3, wherein the light leakage blocking member is adjacent to the fixing hole to surround at least part of the fixing hole.

5. The backlight assembly of claim 1, wherein the light leakage blocking member comprises a synthetic resin.

6. The backlight assembly of claim 1, wherein the light leakage blocking member is separately formed from the supporting member.

7. A backlight assembly comprising:
a lamp generating light;
a diffusion plate to diffuse the light generated from the lamp;
a receiving container to receive the lamp, the receiving container including a combining hole; and
a supporting member to support the diffusion plate to maintain a distance between the lamp and the diffusion plate, the supporting member including a light leakage blocking protrusion to block light leakage through the combining hole,
wherein the light leakage blocking surrounds at least a part of the containing hole without covering the combining hole,
wherein the supporting member comprises:
a base substrate;
a lamp clip protruded from the base substrate in a first direction to hold the lamp;
a supporting part protruded from the base substrate in the first direction to support the diffusion plate; and
a fixing clip protruded from the base substrate in a second direction that is substantially opposite to the first direction to be inserted into the combining hole so that the supporting member is combined with the receiving container, and
wherein the light leakage blocking protrusion protrudes from the base substrate in the second direction and contacts the receiving container.

8. The backlight assembly of claim 7, wherein the light leakage blocking protrusion is spaced apart from the fixing clip, and surrounds at least part of the fixing clip.

9. The backlight assembly of claim 7, further comprising a reflecting plate interposed between the supporting member and the receiving container.

10. The backlight assembly of claim 9, wherein the reflecting plate comprises a fixing hole to receive the light leakage blocking protrusion.

11. The backlight assembly of claim 10, wherein the light leakage blocking protrusion has a substantially same thickness as the reflecting plate.

12. A backlight assembly comprising:
a lamp generating light;
a diffusion member to diffuse the light generated from the lamp;
a supporting member to support the diffusion member to maintain a distance between the diffusion member and the lamp; and
a receiving container to receive the lamp and the supporting member, the receiving container including a light leakage blocking protrusion protruded toward the lamp, the light leakage blocking protrusion overlapping the lamp, and a combining hole corresponding to the light leakage blocking protrusion to receive a portion of the supporting member,
wherein the supporting member comprises:
a base substrate;
a lamp clip protruded from the base substrate in a first direction to hold the lamp;
a supporting member protruded from the base substrate in the first direction to support the diffusion member; and
a fixing clip protruded from the base substrate in a second direction that is substantially opposite to the first direction to be inserted into the combining hole so that the supporting member is combined with the receiving container.

13. The backlight assembly of claim 12, wherein the light leakage blocking protrusion contacts the base substrate.

14. The backlight assembly of claim 12, further comprising a reflecting plate interposed between the lamp and the receiving container.

15. The backlight assembly of claim 14, wherein the reflecting plate comprises a fixing hole to receive the light leakage blocking protrusion.

16. A liquid crystal display device comprising:
a liquid crystal display panel that displays an image; and
a backlight assembly including:
a lamp generating light;
a diffusion member to diffuse the light generated from the lamp;
a supporting member to support the diffusion member to maintain a distance between the lamp and the diffusion plate;
a receiving container to receive the lamp, the receiving container including a combining hole to receive a portion of the supporting member;
a light leakage blocking member disposed under the lamp between the supporting member and the receiving container to block light leakage through the combining hole; and
a reflecting plate interposed between the supporting member and the receiving container,
wherein the light leakage blocking member is interposed between the reflecting plate and the supporting member, the light leakage blocking member overlapping the reflecting plate without covering the combining hole,
wherein the supporting member comprises:
a base substrate;
a lamp clip protruded from the base substrate in a first direction to hold the lamp;
a supporting member protruded from the base substrate in the first direction to support the diffusion member; and
a fixing clip protruded from the base substrate in a second direction that is substantially opposite to the first direction to be inserted into the combining hole so that the supporting member is combined with the receiving container.

17. The liquid crystal display device of claim 16, wherein the light leakage blocking member surrounds at least part of the combining hole.

18. The liquid crystal display device of claim 16, wherein the reflecting plate includes a fixing hole corresponding to the combining hole to receive the portion supporting member.

19. The liquid crystal display device of claim 18, wherein the light leakage blocking member surrounds at least part of the fixing hole.

20. The liquid crystal display device of claim 16, wherein the light leakage blocking member is separately formed from the supporting member.

21. A liquid crystal display device comprising:
a liquid crystal display panel that displays an image; and
a backlight assembly including:
a lamp generating light;
a diffusion member to diffuse the light generated from the lamp;
a receiving container to receive the lamp, the receiving container including a combining hole; and
a supporting member to support the diffusion member to maintain a distance between the lamp and the diffusion plate, the supporting member including a light leakage blocking protrusion that blocks a light leakage through the combining hole,
wherein the light leakage blocking surrounds at least a part of the containing hole without covering the combining hole,
wherein the supporting member comprises:
a base substrate;
a lamp clip protruded from the base substrate in a first direction to hold the lamp;
a supporting part protruded from the base substrate in the first direction to support the diffusion plate; and
a fixing clip protruded from the base substrate in a second direction that is substantially opposite to the first direction to be inserted into the combining hole so that the supporting member is combined with the receiving container, and
wherein the light leakage blocking protrusion is protruded from the base substrate in the second direction and contacts the receiving container.

22. The liquid crystal display device of claim 21, further comprising a reflecting plate interposed between the supporting member and the receiving container.

23. The liquid crystal display device of claim 22, wherein the reflecting plate includes a fixing hole to receive the light leakage blocking protrusion.

24. A liquid crystal display device comprising:
a liquid crystal display panel that displays an image; and
a backlight assembly including:
a lamp generating light;
a diffusion member to diffuse the light generated from the lamp;
a supporting member to support the diffusion member to maintain a distance between the lamp and the diffusion plate; and
a receiving container to receive the lamp and the supporting member, the receiving container including a light leakage blocking protrusion protruded toward the lamp, the light leakage blocking protrusion overlapping the lamp, and a combining hole corresponding to the light leakage blocking protrusion to receive a portion of the supporting member,
wherein the supporting member comprises:
a base substrate;
a lamp clip protruded from the base substrate in a first direction to hold the lamp;
a supporting member protruded from the base substrate in the first direction to support the diffusion member; and
a fixing clip protruded from the base substrate in a second direction that is substantially opposite to the first direction to be inserted into the combining hole so that the supporting member is combined with the receiving container.

25. The liquid crystal display device of claim 24, further comprising a reflecting plate interposed between the lamp and the receiving container.

26. The liquid crystal display device of claim 25, wherein the reflecting plate includes a fixing hole that receives the light leakage blocking protrusion.

* * * * *